United States Patent [19]

Chen et al.

[11] Patent Number: 5,903,891
[45] Date of Patent: May 11, 1999

[54] HIERARCHIAL INFORMATION PROCESSES THAT SHARE INTERMEDIATE DATA AND FORMULATE CONTRACT DATA

[75] Inventors: Qiming Chen, Sunnyvale; Umeshwar Dayal, Saratoga, both of Calif.

[73] Assignee: Hewlett-Packard Company, Palo Alto, Calif.

[21] Appl. No.: 08/804,990

[22] Filed: Feb. 25, 1997

[51] Int. Cl.$^6$ .................................................. G06F 17/30
[52] U.S. Cl. ................................... 707/10; 707/8; 707/9; 395/200; 364/578
[58] Field of Search ................................ 707/8, 201, 7, 707/9, 10, 101, 104, 204, 203, 531; 705/37, 38; 395/200, 683, 702; 364/578, 916, 927; 380/23, 25

[56] References Cited

U.S. PATENT DOCUMENTS

| | | | |
|---|---|---|---|
| 5,241,645 | 8/1993 | Cimral et al. | 707/1 |
| 5,742,806 | 4/1998 | Reiner et al. | 707/3 |
| 5,745,755 | 4/1998 | Covey | 707/203 |
| 5,764,897 | 6/1998 | Khalidi | 707/10 |

OTHER PUBLICATIONS

Biliris et al, "Asset: A System for Supporting Extended Transactions", 1994, pp. 44–54.

Buchmann et al., "Transaction Model for Active Distributed Object Systems", in A Elmagarmid (ed) Transaction Models for Advanced Database Applications, Morgan–Kaufmann, 1992, pp. 124–158.

Chen et al., "Contracting Transaction Hierarchies", Proc. of RIDE '96, 1995, pp. 70–75.

Chen et al., "Commit Scope Control in Nested Transactions", Proc of EDBT '96, Industrial Track, 1996, pp. 621–624.

Chrysanthis et al., "A Formalism for Extended Transaction Models", In VLDB '91, pp. 103–112.

Chrysanthis et al., "Acta: The Saga Continues", in A Elmagarmid (ed) Transaction Models for Advanced Database Applications, Morgan–Kaufmann, 1992, pp. 348–397.

Dayal et al., "A Transactional Model for Long–Running Activities", In VLDB '91, 1991, pp. 113–122.

Garcia–Molina et al., "Sagas", In Proc. ACM–SIGMOD '87, 1987, pp. 249–259.

Gray et al., "Transaction Processing: Concepts and Techniques", Morgan Kaufmann Publishers, 1993 pp. 195–201 and 210–220.

Harder et al., "Concurrency Control Issues in Nested Transactions", VLDB Journal 2(1), 1993, pp. 39–74.

Mohan et al., "A Transaction Recovery Method Supporting Fine Granularity Locking and Partial Rollbacks Using Write–Ahead Logging", IBM Research Report RJ6649, 1989, pp. 1–45.

E. Moss, "Nested Transactions", In MIT Press, 1985 pp. 1–4 and 44–67.

Nodine et al, "Cooperative Transaction Hierarchy: A Transaction Model to Support Design Applications", In Proc. of VLDB '90, 1990, pp. 83–94.

(List continued on next page.)

*Primary Examiner*—Wayne Amsbury
*Assistant Examiner*—Thu-Thao Havan

[57] ABSTRACT

An information system that enables differing information processes of extended duration to share intermediate data prior to their completion without sacrificing data integrity controls. The information system includes a contract process that is a parent of the information processes. The contract process obtains a set of data updates from one of the child transactions of each of the processes prior to completion of the processes. The contract process generates a set of contract data based upon the data updates obtained from the processes and holds the contract data until successful completion of the processes.

16 Claims, 8 Drawing Sheets

OTHER PUBLICATIONS

Attie et al., "Specifying and Enforcing Intertask Dependencies", In Proc. of VLDB '93, 1993, pp. 134–145.

Unland et al., "A Transaction Manager Development Facility for Non–Standard Database Systems", in A Elmagarmid (ed) Transaction Models for Advanced Database Applications, Morgan–Kaufmann, 1992, pp. 400–466.

Wachter et al., "The Contract Model", in A Elmagarmid (ed) Transaction Models for Advanced Database Applications, Morgan Kaufmann, 1992, pp. 218–263.

Weikum et al., "Concepts and Applications of Multilevel Transactions and Open Nested Transactions", in A Elmagarmid (ed) Transaction Models for Advanced Database Applications, Morgan–Kaufmann, 1992, pp. 516–553.

Chen and Dayal, "Contracting Transaction Hierarchies", pp. 70–75, Feb. 26, 1996.

HIERARCHIAL INFORMATION PROCESSES THAT SHARE INTERMEDIATE DATA AND FORMULATE CONTRACT DATA

BACKGROUND OF THE INVENTION

1. Field of Invention

The present invention pertains to the field of information management systems. More particularly, this invention relates to hierarchical information processes that share intermediate data and formulate contract data.

2. Art Background

Information management systems are commonly employed in a variety of business-related and other applications. Such information management systems typically include information stores such as database management systems. Such information management systems usually include and one or more information processes that manipulate data which is persistently stored in the database. Such information processes may also be referred to as applications. Information processes that perform extended duration information management functions may be arranged as a hierarchy of nested transactions.

FIG. 1 illustrates an information process 36 which is arranged as a hierarchy of nested transactions 30–32 in accordance with the prior art. The transaction 30 is at a top level of the process 36 hierarchy. The transaction 30 spawns the transactions 31 and 32. The transaction 30 is referred to as the parent of the transactions 31 and 32. The transactions 31 and 32 are each referred to as a child of the transaction 30. In general, such a nested hierarchy of transactions may continue down through many levels.

Typically, each of the transactions 30–32 performs some sort of information management function that generates data updates targeted for an information store 34. Typically, the transactions 31 and 32 provide their respective data updates to the transaction 30 upon their completion. The act of a child transaction providing its data updates to its parent is referred to as committing updates to the parent transaction or committing to the parent. Such transactions that commit their updates to their parent are usually referred to as closed transactions.

The data updates generated by the closed transactions 31–32 are usually interrelated. The transaction 30 usually acts as a repository for the interrelated data updates generated by the closed transactions 31 and 32. Typically, the transaction 30 commits to the information store 34 only after both of the closed transactions 31 and 32 have completed. A process wherein all child transactions are closed and wherein the parent transaction commits only after all its child transactions complete is referred to as a closed hierarchy.

The transaction 30 usually commits the data updates to the information store 34 using single atomic transaction. Typically, such an "atomic" or "flat" transaction ensures that the interrelated data updates generated by the transactions 30–32 are either all made visible or none are made visible in the information store 34 should a system failure occur. This usually ensures the integrity of the interrelated data generated by the transactions 30–32 as the data appears in the information store 34.

Under some circumstances a child transaction such as the transaction 31 may be of extended duration. For example, the transaction 31 may involve extended user interaction as well as communication to a remote site involving hours, days, and even weeks for completion. The transaction 32, on the other hand, may complete relatively quickly. Nevertheless, if the transaction 32 is a closed transaction then its data updates are held by the transaction 30 until the transaction 31 has completed. Such a hold up of data updates from the transaction 32 usually delays other information processes that may require the updated data generated by the transaction 32.

One prior technique for making the data updates of the child transaction 32 available to other processes prior to the completion of the process 36 is to allow the child transaction 32 to commit its data updates to the information store 34 directly. A child transaction that commits directly to the information store 34 is referred to as an open child transaction. Unfortunately, such direct writes to the information store 34 by a child transaction sacrifices the data integrity controls which are provided by a closed hierarchy. For example, a system failure after the transaction 32 commits to the information store 34 but before the transaction 30 commits can result in inconsistent data updates being visible in the information store 34.

SUMMARY OF THE INVENTION

An information system is disclosed that enables differing information processes to share intermediate data and formulate contract data prior to their completion without sacrificing data integrity controls. The differing information processes include a first process having a parent transaction and a set of child transactions one of which is an interacting transaction of the first process. The parent transaction of the first process holds a set of data updates generated by each of the child transactions of the first process until all of the child transactions of the first process have completed. The differing information processes also include a second process having a parent transaction and a set of child transactions one of which is an interacting transaction of the second process. The parent transaction of the second process holds a set of data updates generated by each of the child transactions of the second process until all of the child transactions of the second process have completed. The information system further includes a contract process that obtains a set of data updates from the interacting transaction of each of the first and second processes prior to completion of the first and second processes and that generates a set of contract data based upon the data updates from the first and second processes. In one embodiment, the contract process includes a contract-parent transaction which is a parent of the interacting transactions. In another embodiment, the contract process includes a contract-child transaction which is a child of the interacting transactions.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
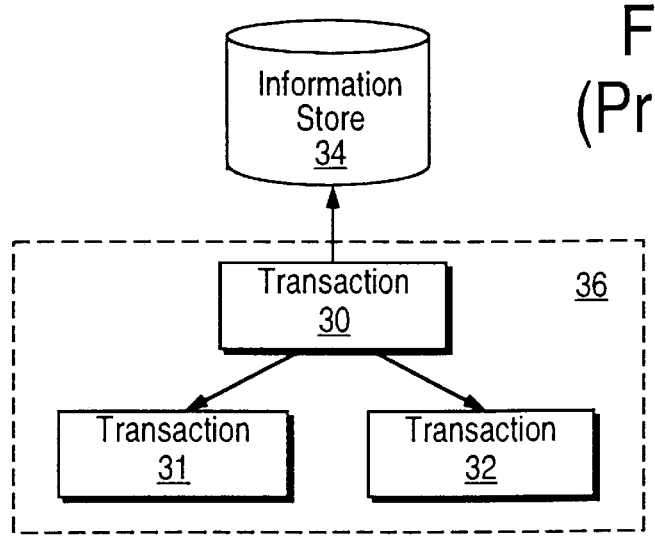
FIG. 1 illustrates a process which is arranged as a hierarchy of open or closed nested transactions in accordance with the prior art.
Figure 2:
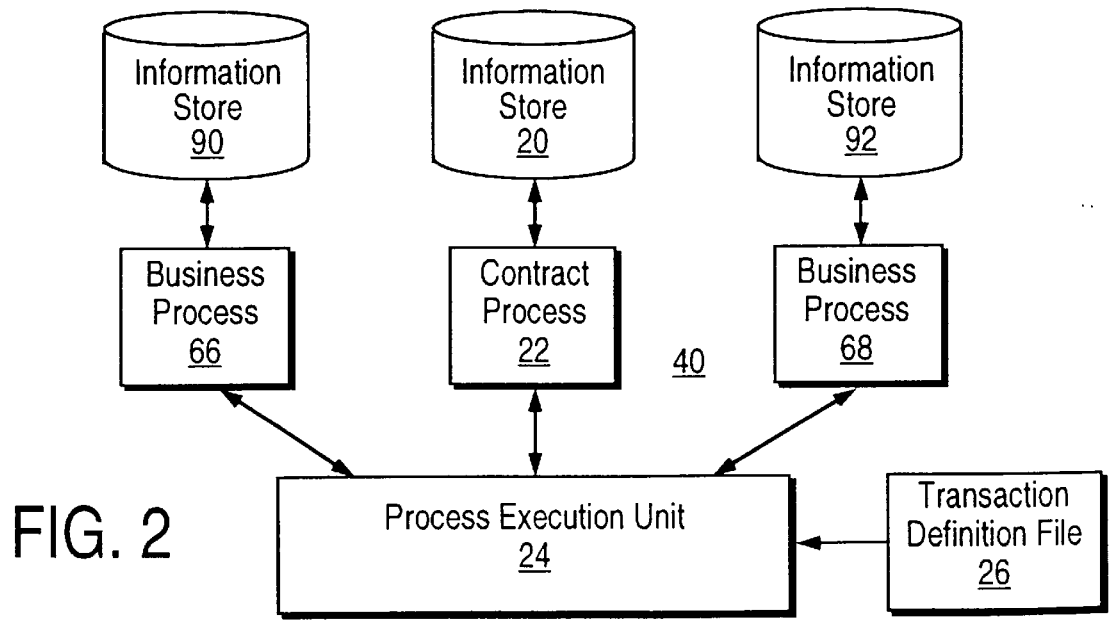
FIG. 2 illustrates an information processing system that enables hierarchical processes to share intermediate data and formulate contract data.

FIG. 2 illustrates one embodiment an information system 40 that enables processes to share intermediate data and formulate contract data. The information system 40 includes a pair of information processes 66 and 68, a contract process 22, a process execution unit 24 and a transaction definition file 26. The contract process 22 enables the formulation of contract data between the information process 66 and 68 prior to their completion and ensures data integrity by holding the contract data until successful completion of the information processes 66 and 68. In addition, the information system 40 provides flexible control in specifying the vitalness of the transaction contained in the information processes 66, 68 and the contract process 22.

Each information process 66 and 68 conducts information processing functions for a separate enterprise. The information process 66 stores persistent data for the corresponding enterprise in an information store 90 and the information process 68 stores persistent data for the corresponding enterprise in an information store 92. In one embodiment, the information stores 90 and 92 are relational database management systems. In other embodiments, the information stores 90 and 92 may be other types of database systems or conventional file systems.

The contract process 22 obtains intermediate data from each of the information processes 66 and 68 prior to their completion. The contract process 22 uses the obtained intermediate data to formulate a set of contract data that represents an agreement between the enterprises associated with the information processes 66 and 68. The contract process 22 in one embodiment stores the contract data in an information store 20 which may be a relational database management system or another type of database system or may be a conventional file system. In other embodiments, the contract process 22 may commit the contract data to the information store 90 or the information store 92.

Each of the information process 66 and 68 is arranged as a hierarchy of transactions. The transaction definition file 26 contains specifications that define the hierarchies of the information processes 66 and 68 as well as specifications that define the interaction between the information processes 66 and 68 and the contract process 22. The process execution unit 24 creates and manages the processes 66, 68, and 22 according to the specifications provided in the transaction definition file 26.

In one example, the information process 66 is an information process for a parts supplier and the information process 68 is an information process for a manufacturer. The contract process 22 obtains inventory information from the information process 66 and parts ordering information from the information process 68 and formulates a contract or agreement defined by a set of contract data.

Figure 3:
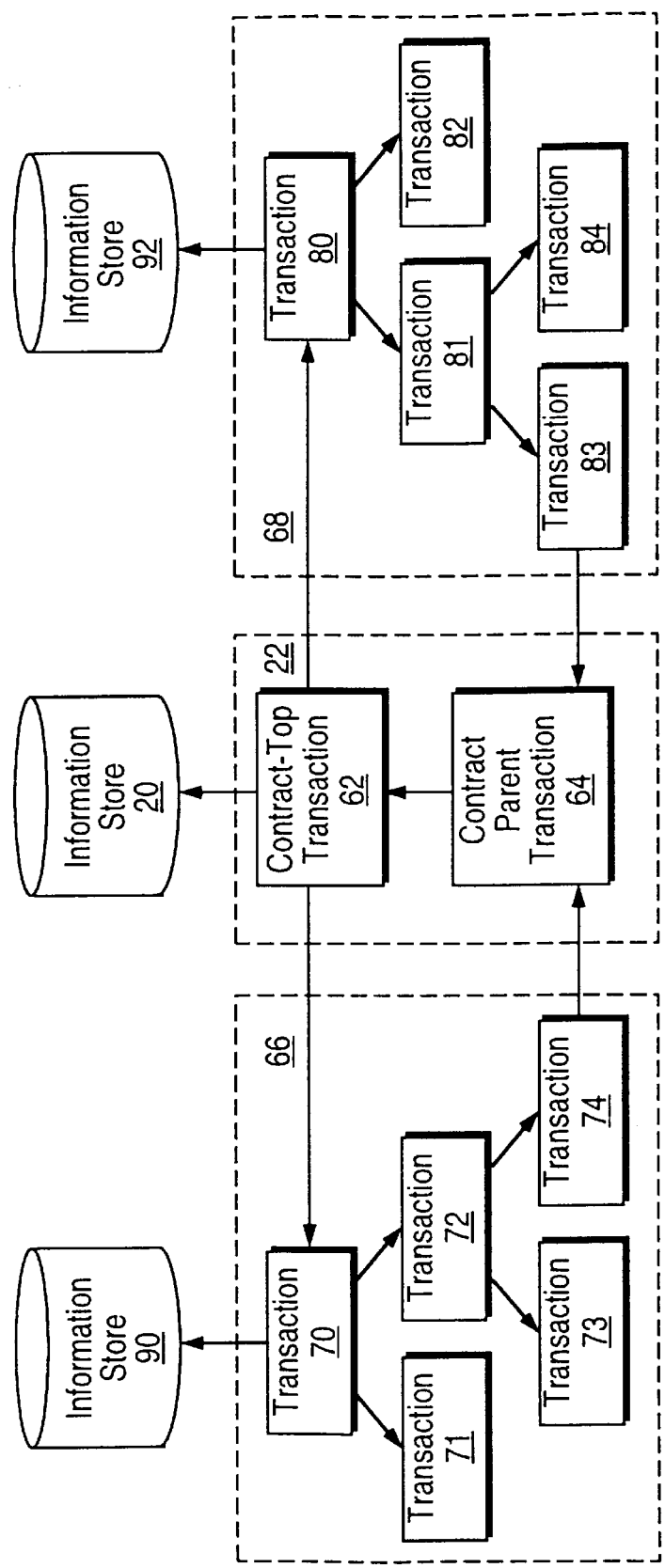
FIG. 3 illustrates a hierarchical arrangement of a contract process and a pair of information processes in one embodiment.

FIG. 3 illustrates the hierarchical arrangement of the contract process 22 and the information processes 66 and 68 in one embodiment. The information process 68 includes a hierarchical arrangement of transactions 70–74 and the information process 68 includes a hierarchical arrangement of transactions 80–84.

In this embodiment, the contract process 22 includes a contract-top transaction 62 and a contract-parent transaction 64. The contract-parent transaction 64 obtains intermediate data updates from the information processes 66 and 68 prior to their completion. The contract-parent transaction 64 formulates a set of contract data for a contract operation involving the information processes 66 and 68 and commits the contract data to the contract-top transaction 62. The contract-top transaction 62 holds the contract data until the successful completion of the information processes 66 and 68.

The process execution unit 24 provides a set of routines or functions that for creating and managing the hierarchical transactions of the processes 66, 68, and 22. The process execution unit 24 includes a start-transaction routine that starts up particular transactions in response to requests from the processes 66, 68, and 22 as well as requests from users. The process execution unit 24 includes a complete-transaction routine for properly handling the completion of the transactions in the processes 66,68, and 22. The process execution unit 24 also includes an abort-transaction routine for handling failures that occur in the transactions of the processes 66, 68, and 22.

The process execution unit 24 manages the processes 66, 68, and 22 such that all parent transactions have completion dependencies on their children. For example, the transaction 72 cannot complete until its child transactions 73 and 74 complete and the transaction 81 cannot complete until its child transactions 83 and 84 complete. Similarly, the contract-parent transaction 64 cannot complete until it child transactions 74 and 83 complete and the contract-top transaction 62 cannot complete until its child transactions 70, 80, and 64 complete.

The transaction definition file 26 contains a set of transaction specifications for each of the transactions 70–74, 80–84, as well as the contract-top transaction 62 and the contract-parent transaction 64. Each set of transaction specifications includes an identification of a data set associated with the corresponding transaction, a list of child transactions for the corresponding transaction and an indication of their "vitalness," and a specification of commit/notify actions to be taken upon completion of the corresponding transaction.

The transaction specifications contained in the transaction definition file 26 for the contract-top transaction 62 are shown below.

| | |
|---|---|
| Data Set Identifier | data objects in the information store 20 |
| Child Transaction | transaction 70 (vital) |
| Child Transaction | transaction 80 (vital) |
| Child Transaction | contract-parent transaction 64 (vital) |
| Completion Actions | commit updates to the information store 20 |

The transaction specification indicate that the contract-top transaction 62 is a parent of the transactions 70 and 80 as well as the contract-parent transaction 64. The transaction specifications indicate that the child transactions 70,80, and 64 are all vital to the contract-top transaction 62 and that updates of the data set for the contract-top transaction 62 (i.e. the contract data) are to be committed to the information store 20 upon completion of the contract-top transaction 62.

The transaction specifications contained in the transaction definition file 26 for the transaction 70 are shown below.

| | |
|---|---|
| Data Set Identifier | data objects in the information store 90 |
| Child Transaction | transaction 71 (not vital) |
| Child Transaction | transaction 72 (vital) |
| Completion Actions | commit updates to the information store 90 |

The transaction specifications for the transaction 70 indicate that the transactions 71 and 72 are each child transactions of the parent transaction 70. The transaction specifications for the transaction 70 also indicate that the transaction 72 is vital to the transaction 70 and that the transaction 71 is not vital to the transaction 70.

The transaction specifications contained in the transaction definition file 26 for the transaction 72 are shown below.

| | |
|---|---|
| Data Set Identifier | data objects inherited from the transaction 70 |
| Child Transaction | transaction 73 (not vital) |
| Child Transaction | transaction 74 (vital) |
| Completion Actions | commit updates to the transaction 70 |

The transaction specifications indicate that the transaction 72 is the parent of the child transactions 73 and 74 and that the transaction 74 is vital. The transaction definition file 26 also specifies that the transaction 72 inherits a data set from its parent transaction 70 and that upon completion the transaction 72 commits its updates of the data objects inherited from the transaction 70 back to the transaction 70.

The transaction specifications contained in the transaction definition file 26 for the transaction 80 are shown below.

| | |
|---|---|
| Data Set Identifier | data objects in the information store 92 |
| Child Transaction | transaction 81 (vital) |
| Child Transaction | transaction 82 (not vital) |
| Completion Actions | commit updates to the information store 92 |

The transaction specifications contained in the transaction definition file 26 for the transaction 81 are shown below.

| | |
|---|---|
| Data Set Identifier | data objects inherited from the transaction 80 |
| Child Transaction | transaction 83 (vital) |
| Child Transaction | transaction 84 (vital) |
| Completion Actions | commit updates to the transaction 80 |

In this embodiment, the contract-parent transaction 64 obtains intermediate data from the transactions 74 and 83. The transactions 74 and 83 are referred to as interacting transactions. The interacting transactions 74 and 83 have start dependancies on their respective parent transactions 72 and 81 which are referred to as their birth parents. The transaction 74 cannot start before the transaction 72 starts and the transaction 83 cannot start before the transaction 81 starts. These start dependencies are enforced by the process execution unit 24.

The interacting transaction 74 executes either as a concurrent or sequential child transaction of the contract-parent transaction 64. The transaction specifications contained in the transaction definition file 26 for the interacting transaction 74 are shown below.

| | |
|---|---|
| Data Set Identifier | data objects inherited from the transaction 72; and data objects inherited from the contract-parent transaction 64 |
| Completion Actions | commit updates to the contract-parent transaction 64; and notify the birth parent transaction 72 |

The transaction specifications for the transaction 74 indicate that the interacting transaction 74 inherits data objects from its birth parent transaction 72 as well as data objects from the contract-parent transaction 64. The interacting transaction 74 can read data objects inherited from its birth parent transaction 72, and can read or write data objects inherited from the contract-parent transaction 64.

The transaction specifications for the transaction 74 also indicate that the interacting transaction 74 commits its data updates to the contract-parent transaction 64 upon completion and that its birth parent 72 is to be notified upon the completion of the interacting transaction 74. This notification allows the transaction 72 to complete after its other children complete.

Similarly, the interacting transaction 83 executes either as a concurrent of sequential child transaction of the contract-parent transaction 64. The transaction specifications contained in the transaction definition file 26 for the interacting transaction 83 are shown below.

| | |
|---|---|
| Data Set Identifier | data objects inherited from the transaction 81; and data objects inherited from the contract-parent transaction 64 |
| Completion Actions | commit updates to the contract-parent transaction 64; and notify the birth parent transaction 81 |

The transaction 83 can read data objects inherited from its birth parent transaction 81, and can read or write data objects inherited from the contract-parent transaction 64. The interacting transaction 83 commits to the contract-parent transaction 64 upon completion and its birth parent a transaction 81 is to be notified upon completion of the interacting transaction 83. This notification allows the transaction 81 to complete after its other children complete.

The transaction specifications contained in the transaction definition file 26 for the contractparent transaction 64 are shown below.

| | |
|---|---|
| Data Set Identifier | data objects inherited from the contract-top transaction 62 |
| Completion Actions | commit updates to the contract-top transaction 62 |

The transaction definition file 26 specifies that the contract-parent transaction 64 upon completion commits to the contract-top transaction 62.

The contract-top transaction 62 holds the contract data involved in the contract operation between the information processes 66 and 68. The contract-top transaction 62 commits to the information store 20 after the information processes 66 and 68 have completed. The transactions 70 and 80 are open ended children of the contract-top transaction 62. This means that the transactions 70 and 80 can commit data updates to the information stores 90–92, respectively, independently of their parent contract-top transaction 62.

Figure 4A:
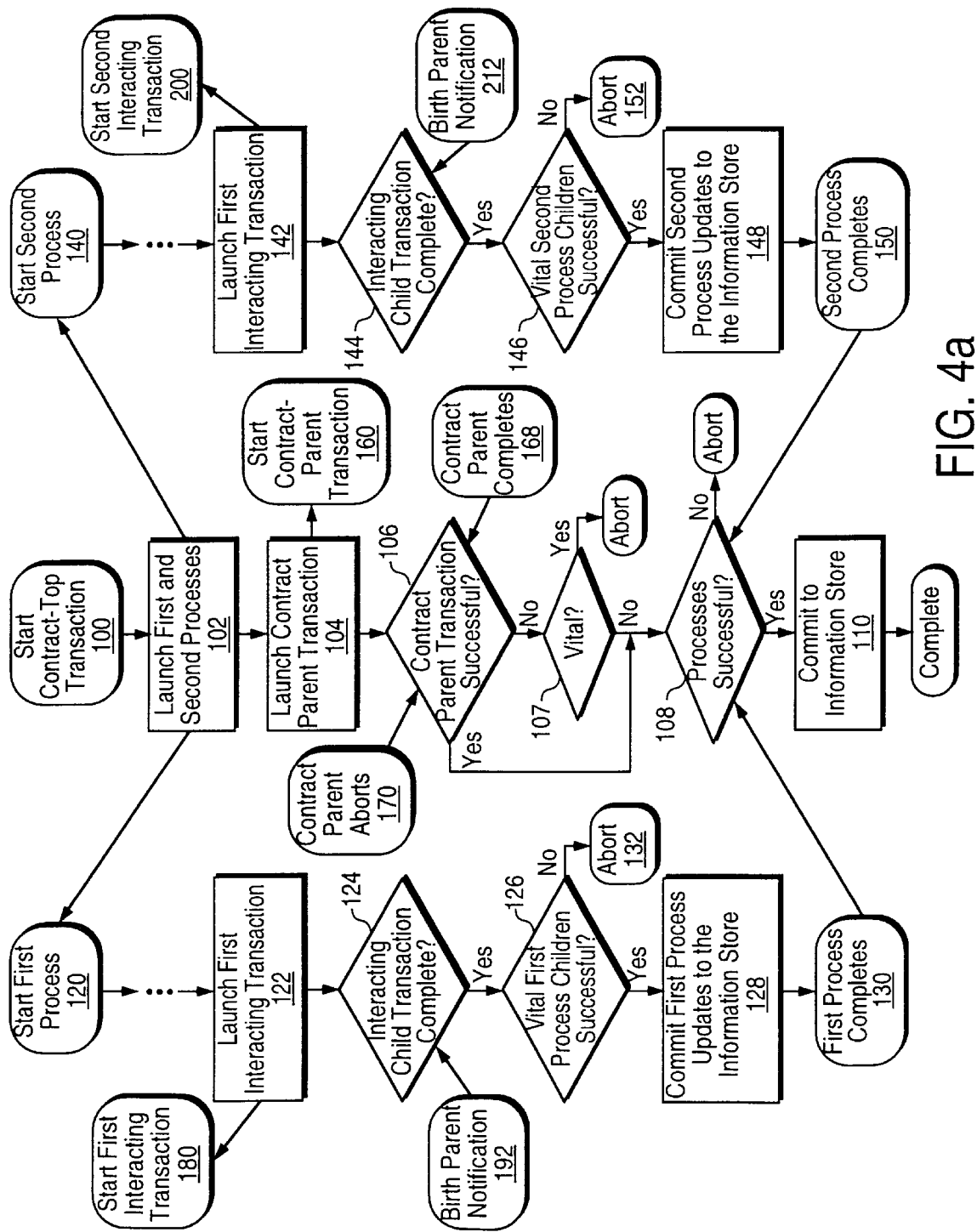
FIGS. 4a–4b illustrate the interaction among the information processes and the contract process for the embodiment shown in FIG. 3.
Figure 4B:
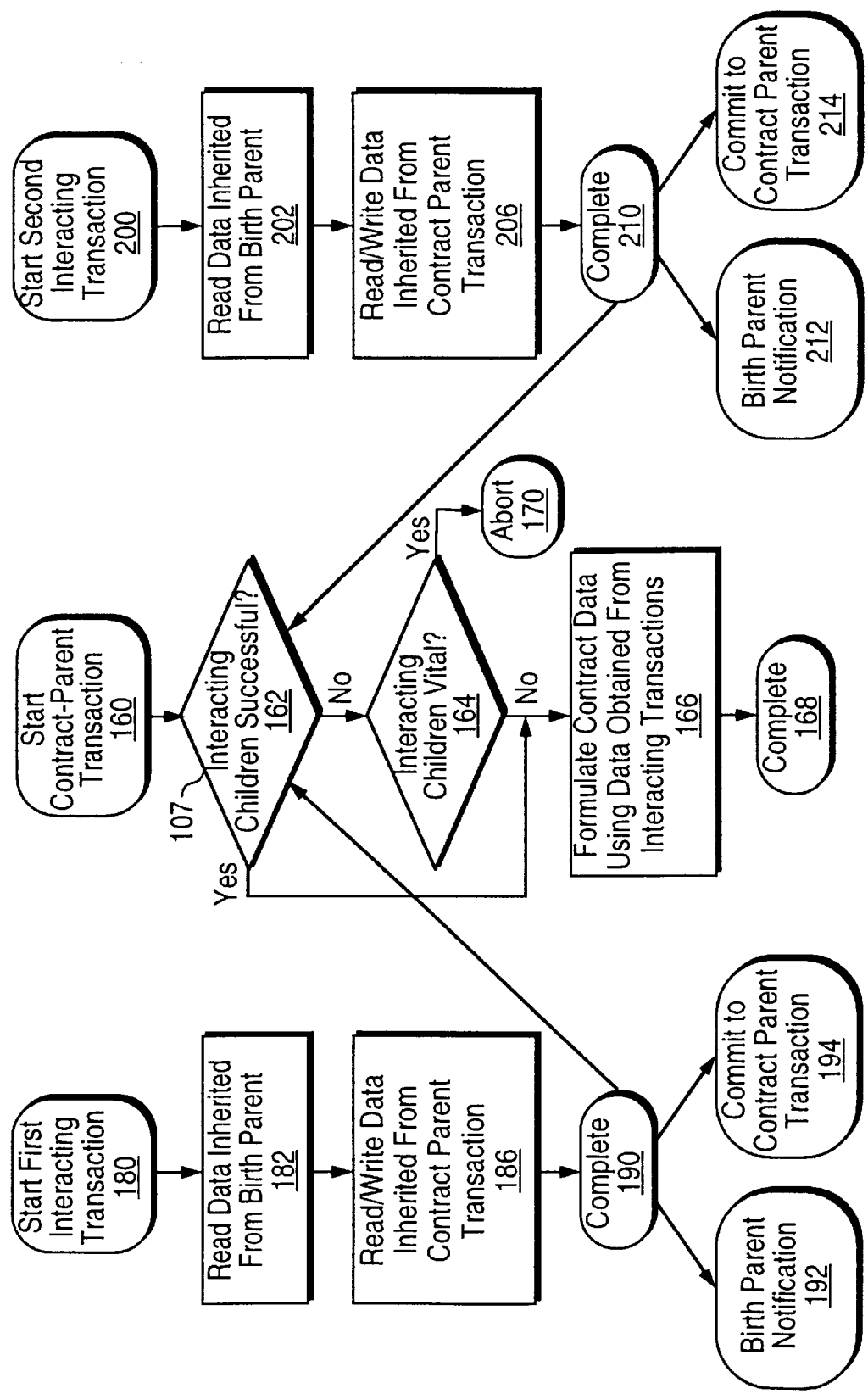

FIGS. 4a–4b illustrate the interaction among the information processes 66 and 68 and the contract process 22 for the embodiment shown in FIG. 3. The information processes 66 and 68 are referenced as the first and second processes, respectively. The interacting transactions 74 and 83 are referenced as the first and second interacting transactions, respectively.

At block 100, the process execution unit 24 starts the contract-top transaction 62 in response to the contents of the transaction definition file 26 or a user request. At block 102, the contract-top transaction 62 launches the first and second processes 66 and 68 as child processes. At block 104, the contract-top transaction 62 launches the contract-parent transaction 64 as a child transaction. The contract-top transaction 62 invokes the start-transaction functions provided by the process execution unit 24 to launch the first and second processes 66 and 68 as well as the contractparent transaction 64. Alternatively, the first and second processes 66 and 68 and the contract-parent transaction 64 may be launched automatically by the process execution unit 24 after launching the contract-top transaction 62 as specified in the transaction definition file 26.

The contract-top transaction 62 waits at block 106 for the contract-parent transaction 64 to complete. The contract-top transaction 62 may be suspended at block 106 and then subsequently resumed by the process execution unit 24 when handling a complete-transaction or abort-transaction function call from the contract-parent transaction 64. The process execution unit 24 provides the contract-top transaction 62 with an indication of wether the contract-parent transaction 64 completed successfully or aborted. If the contract-parent transaction 64 completed successfully then control proceeds to block 108 to continue the contract operation.

If the contract-parent transaction 64 aborted, control proceeds to block 107. At block 107, it is determined whether the contract-parent transaction 64 is deemed vital. An indication of whether the contract-parent transaction 64 is vital to the contract-top transaction 62 is contained in the transaction specifications for the contract-top transaction 62 which are contained in the transaction definition file 26. If the contract-parent transaction 64 is deemed vital, the contract-top transaction 62 aborts and no contract data updates are committed to the information store 20. If the contract-parent transaction 64 is not vital, control proceeds to block 108 to continue with the contract operation.

At block 108, the contract-top transaction 62 waits for completion of the first and second processes 66 and 68. The process execution unit 24 resumes the contract-top transaction 62 once the first and second processes 66 and 68 either abort (by invoking the abort-transaction function from the transactions 70 or 80) or complete (by invoking the complete-transaction function from the transactions 70 and 80). The process execution unit 24 provides an indication of wether the process 66 and the process 68 each completed successfully or aborted. If both the first and second processes 66 and 68 complete successfully at block 108, then control proceeds to block 110 where contract-top transaction 62 commits to the information store 20. The contract-top transaction 62 commits to the information store 20 by writing all of the contract data committed to the contract-top transaction 62 by the contract-parent transaction 64 to the information store 20 in a single atomic transaction.

If either one or both of the first and second processes 66 and 68 aborted, then at block 108 the contract-top transaction 62 aborts and does not commit to the information store 20. Thus, the first and second processes 66 and 68 are deemed to be vital to the contract-top transaction 62 in that the contract data held by the contract-top transaction 62 is discarded if either one of its child processes 66 and 68 fails.

The contract-parent transaction 64 starts up at block 160. At block 162, the contract-parent transaction 64 waits for completion of the interacting transactions 74 and 83. The process execution unit 24 provides the contract-parent transaction 64 with an indication of wether the transactions 74 and 83 each completed successfully or aborted. If both transactions 74 and 83 complete successfully then control proceeds to block 166 to continue with the contract operation. At block 166, the contract operation continues with the formation of the contract data for the contract operation using the data committed to the contract-parent transaction 64 by the interacting transactions 74 and 83 and data inherited from the contract-top transaction 62.

If either one or both of the interacting transactions 74 and 83 aborted, then control proceeds to block 164. At block 174, it is determined whether the interacting transactions 74 and 83 are deemed vital to the contract operation as indicated by the transaction specifications for the contract-parent transaction 64 which are contained in the transaction definition file 26. If any one of the interacting transactions 74, 83 that aborted is vital, then the contract-parent transaction 64 is aborted by invoking the abort-transaction function of the process execution unit 24 wherein the transaction definition file 26 resumes the contract-top transaction 62 at block 106 with an indication that the contract-parent transaction 64 aborted. If the ones of the interacting transactions 74 and 83 that aborted are not vital, then control proceeds to block 166 to continue with the contract operation.

At block 168, the contract-parent transaction 64 completes successfully by invoking the completetransaction function of the process execution unit 24. The complete-transaction function of the process execution unit 24 uses the definitions provided by the transaction definition file 26 to determine that the contract-parent transaction 64 data updates are to be committed to the contract-top transaction 62 upon completion of the contract-parent transaction 64.

The first process 66 starts up at block 120. Eventually, at block 122, first process 66 launches the first interacting transaction 74 by invoking the start-transaction function provided in the process execution unit 24. The first process 66 waits at block 124 for completion of the first interacting transaction 74. The first process 66 resumes at block 124 in response to a birth parent notification 192 from the process execution unit 24. The birth parent notification 192 indicates that the first interacting transaction 74 completed.

At block 126, after all of the other vital child transactions in the first process 66 have successfully completed, control proceeds to block 128. If any of the vital children of the first process 68 do not complete successfully, then the first process 66 aborts at block 126. At block 128, the first process 66 commits to the information store 90 independently of the contract-top transaction 62. At block 130, the first process 66 completes by invoking the complete-process function of the process execution unit 24. The process execution unit 24 logs the first process 66 as successfully completed which enables the contract-top transaction 62 to subsequently complete.

The second process 68 starts up at block 140 and thereafter at block 142 launches the second interacting transaction 83 using the start-transaction function provided in the process execution unit 24. The second process 68 waits at block 144 for completion of the second interacting transaction 83. A birth parent notification 212 from the process execution unit 24 causes the second process 68 to resume at block 144. At block 146, after all of the other vital child transactions in the second process 68 have completed successfully, control proceeds to block 148. If any of the vital children of the second process 68 aborted, then the first process 66 aborts. At block 148, the second process 68 commits to the information store 92 independently of the contract-top transaction 62. At block 150, the second process 68 completes.

At block 180, the first interacting transaction 74 starts up and inherits a set of data objects from its birth parent transaction 72 as indicated by the transaction specification for the transaction 74 which are contained in the transaction definition file 26. At block 182, the first interacting transaction 74 reads the data objects inherited from its birth parent transaction 72. The first interacting transaction 74 also inherits a set of data objects from the contract-parent transaction 64 as indicated by the transaction specifications for the transaction 74 contained in the transaction definition file 26. At block 186, the first interacting transaction 74 writes the data objects inherited from the contract-parent transaction 64 with any data inherited from its birth parent transaction 72 that is needed for the contract operation.

At block 190, the first interacting transaction 74 completes by invoking the complete-transaction function provided by the process execution unit 24. In response, the process execution unit 24 commits the data updates generated by the first interacting transaction 74 to the contract-parent transaction 64 as is indicated by the transaction specifications for the transaction 74. In addition, the process execution unit 24 notifies the birth parent transaction 72 of the completion of the first interacting transaction 74 as is indicated by the transaction specifications for the transaction 74.

The second interacting transaction 83 starts up at block 200 and inherits a set of data objects from its birth parent transaction 81 and a set of data objects from the contract-parent transaction 64. At block 202, the second interacting transaction 83 reads the data objects inherited from its birth parent 81. At block 206, the second interacting transaction 83 writes the data objects inherited from the contract-parent transaction 64 with any data inherited from its birth parent transaction 81 that is needed for the contract operation. At block 210, the second interacting transaction 83 completes by invoking the complete-transaction function provided by the process execution unit 24. In response, the process execution unit 24 commits the data updates generated by the second interacting transaction 83 to the contract-parent transaction 64 and notifies the birth parent transaction 81.

Figure 5:
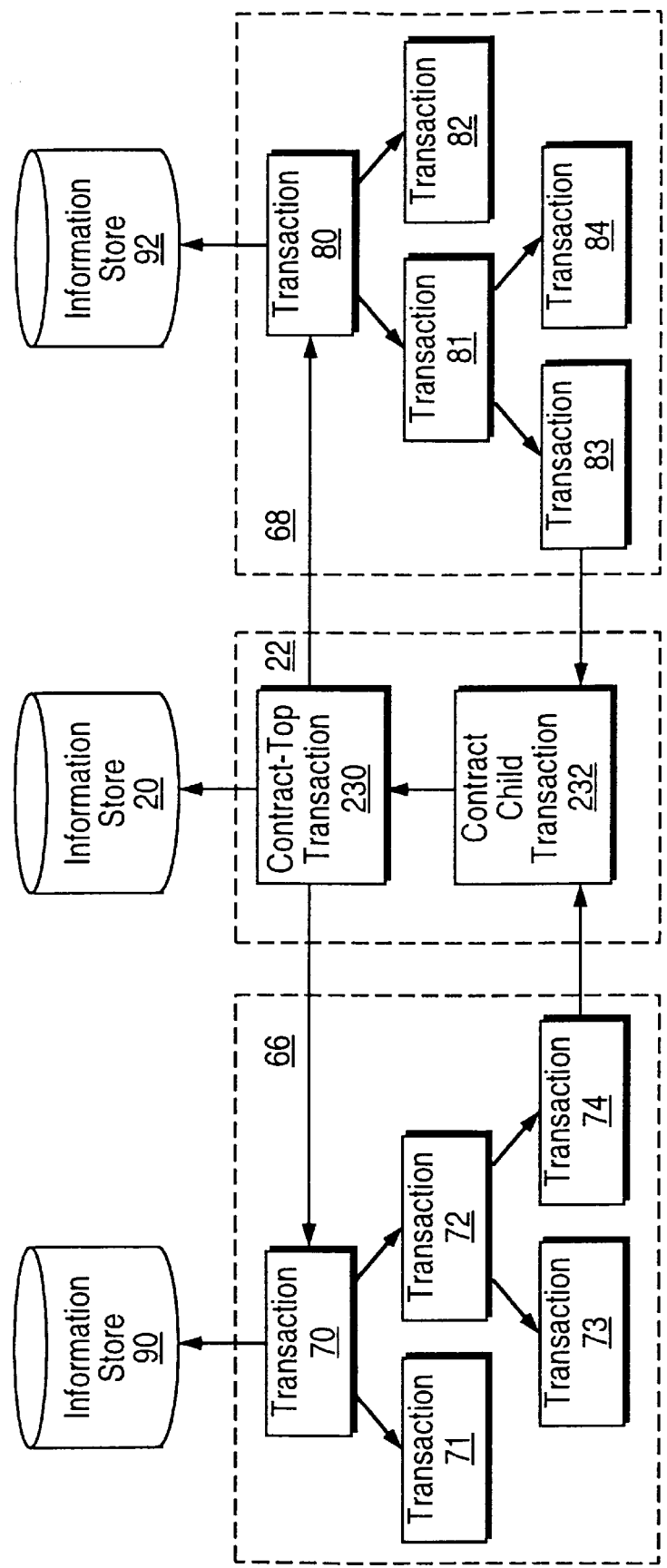
FIG. 5 illustrates a hierarchical arrangement of a contract process and a pair of information processes in another embodiment.

FIG. 5 illustrates the hierarchical arrangement of the contract process 22 and the information processes 66 and 68 in another embodiment. In this embodiment, the contract process 22 includes a contract-top transaction 230 and a contract-child transaction 232. The contract-child transaction 232 obtains intermediate data updates from the information processes 66 and 68 prior to their completion. The contract-top transaction 230 holds the contract data involved in the contract operation until completion of the information processes 66 and 68.

The transaction specifications for the contract-top transaction 230 indicate that the contract-top transaction 230 commits to the information store 20 upon completion. The contract-top transaction 230 is the parent of the first and second processes 66 and 68 and the contract-child transaction 232. The transaction specifications contained in the transaction definition file 26 for the contract-top transaction 230 are shown below.

| Data Set Identifier | data objects in the information store 20 |
|---|---|
| Child Transaction | transaction 70 (vital) |
| Child Transaction | transaction 80 (vital) |
| Child Transaction | contract-child transaction 232 (vital) |
| Completion Actions | commit updates to the information store 20 |

The contract-child transaction 232 obtains intermediate data from the interacting transactions 74 and 83. The contract-child transaction 232 has a start dependency on the interacting transactions 74 and 83. Thus, the contract-child transaction 232 cannot start until the transactions 74 and 83 have started.

The contract-child transaction 232 can read data inherited from the interacting transactions 73 and 84. The contract-child transaction 232 commits to the contract-top transaction 230 upon completion. In addition, the transactions 74 and 83 are notified of the completion of the contract-child transaction 232. The transaction specifications contained in the transaction definition file 26 for the contract-child transaction 232 are shown below.

| Data Set Identifier | data objects inherited from the transactions 74 and 83 |
|---|---|
| Completion Actions | commit updates to the contract-top transaction 230; and notify the transactions 74 and 83 |

The interacting transactions 74 and 83 can read or write data objects inherited from their respective birth parent transaction 72 and 83. In this embodiment, the interacting transactions 74 and 83 commit to their respective birth parent transaction 72 and 83 upon completion. The transaction specifications contained in the transaction definition file 26 for the interacting transaction 74 are shown below.

| Data Set Identifier | data objects inherited from the transaction 72 |
|---|---|
| Completion Actions | commit updates to the transaction 72 |

The transaction specifications contained in the transaction definition file 26 for the interacting transaction 83 are shown below.

| Data Set Identifier | data objects inherited from the transaction 81 |
|---|---|
| Completion Actions | commit updates to the transaction 81 |

The transactions 70 and 80 are open ended children of the contract-top transaction 230 and can commit updates to the information stores 90–92, respectively, independently of their parent contract-top transaction 230. The contract-top transaction 230 commits to the information store 20 only after the information processes 66 and 68 have completed.

Figures 1, 6A:
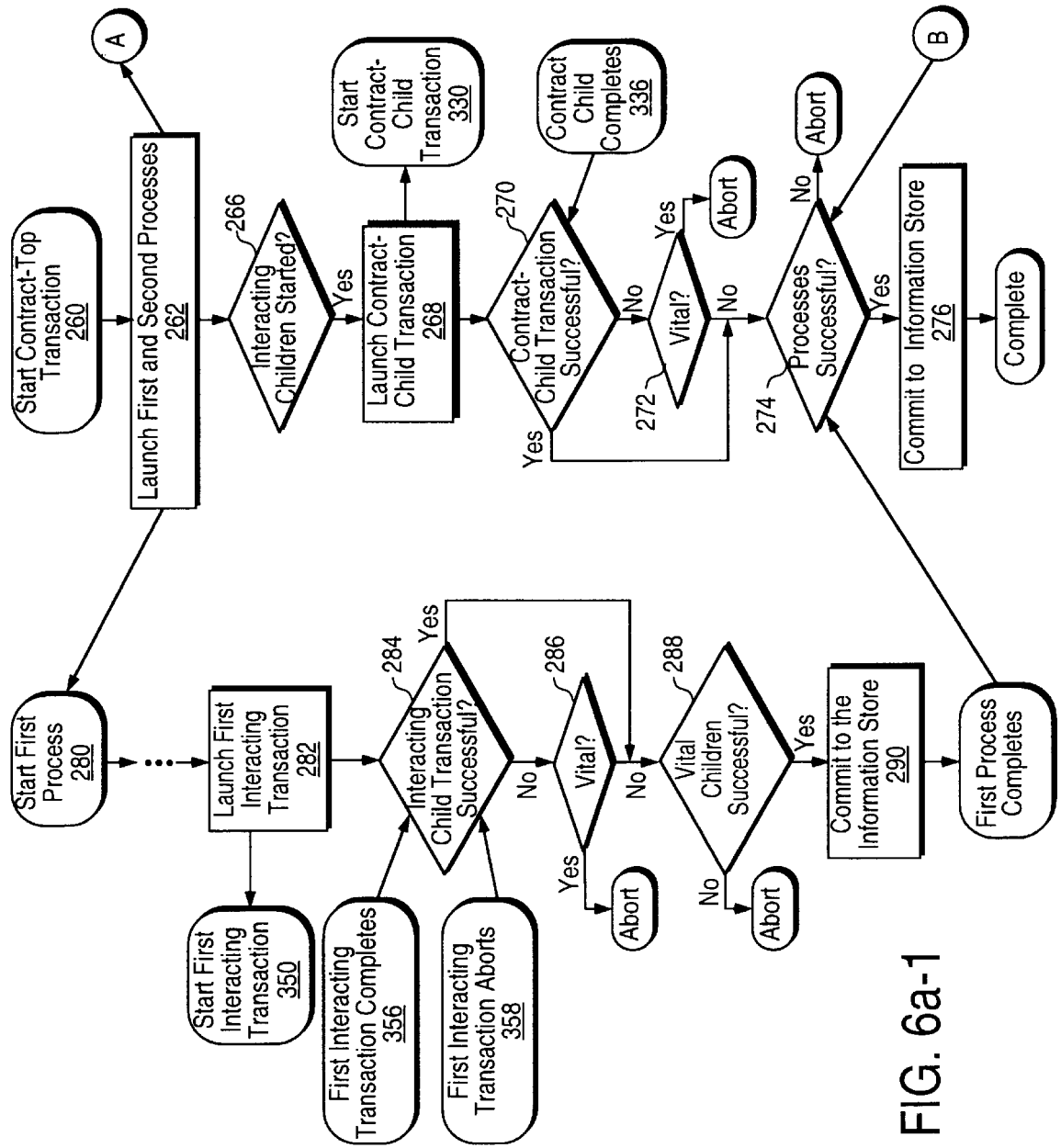
FIGS. 6a–6b illustrate the interaction among the information processes and the contract process for the embodiment shown in FIG. 5.
Figures 2, 6A:
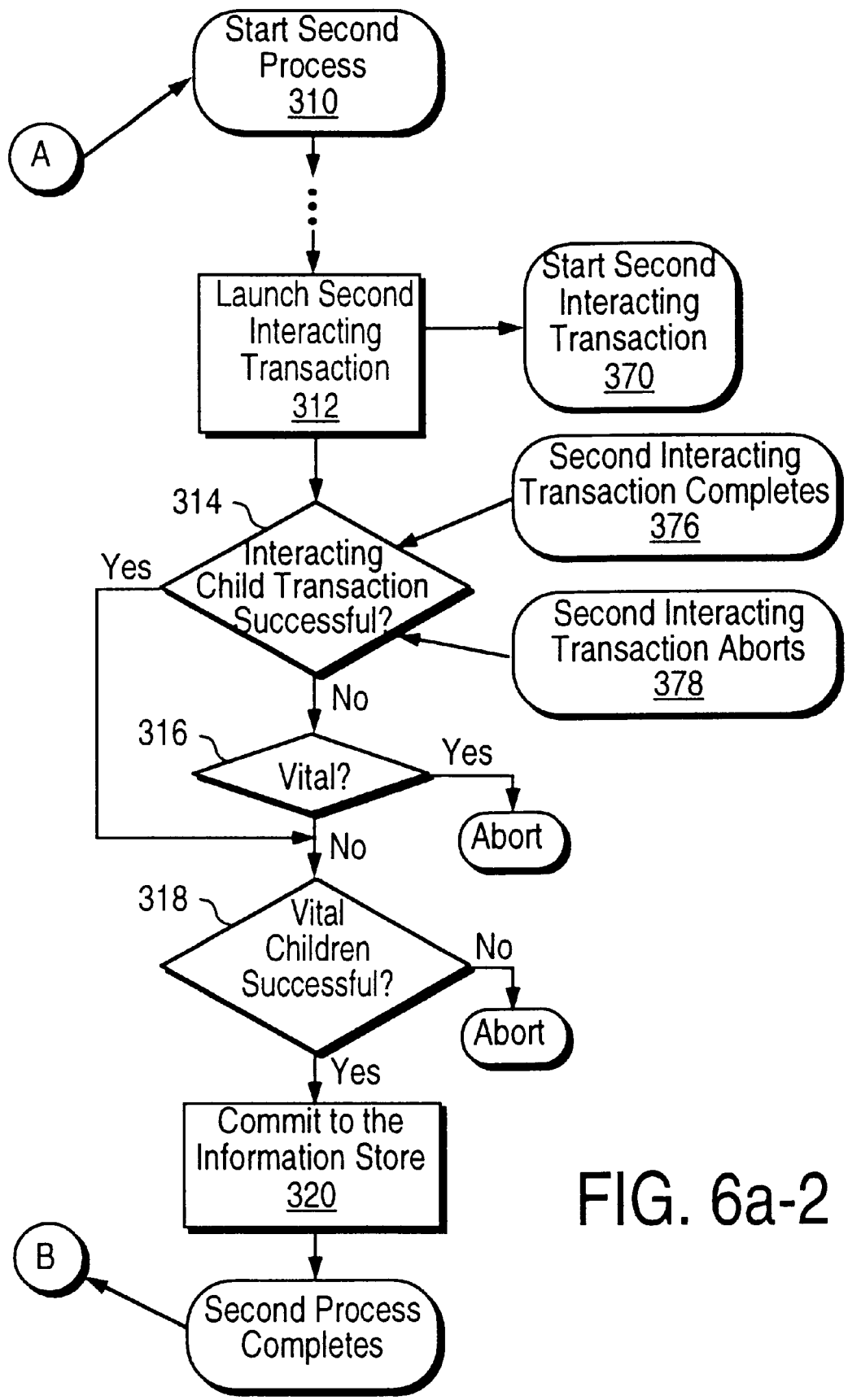
Figure 6B:
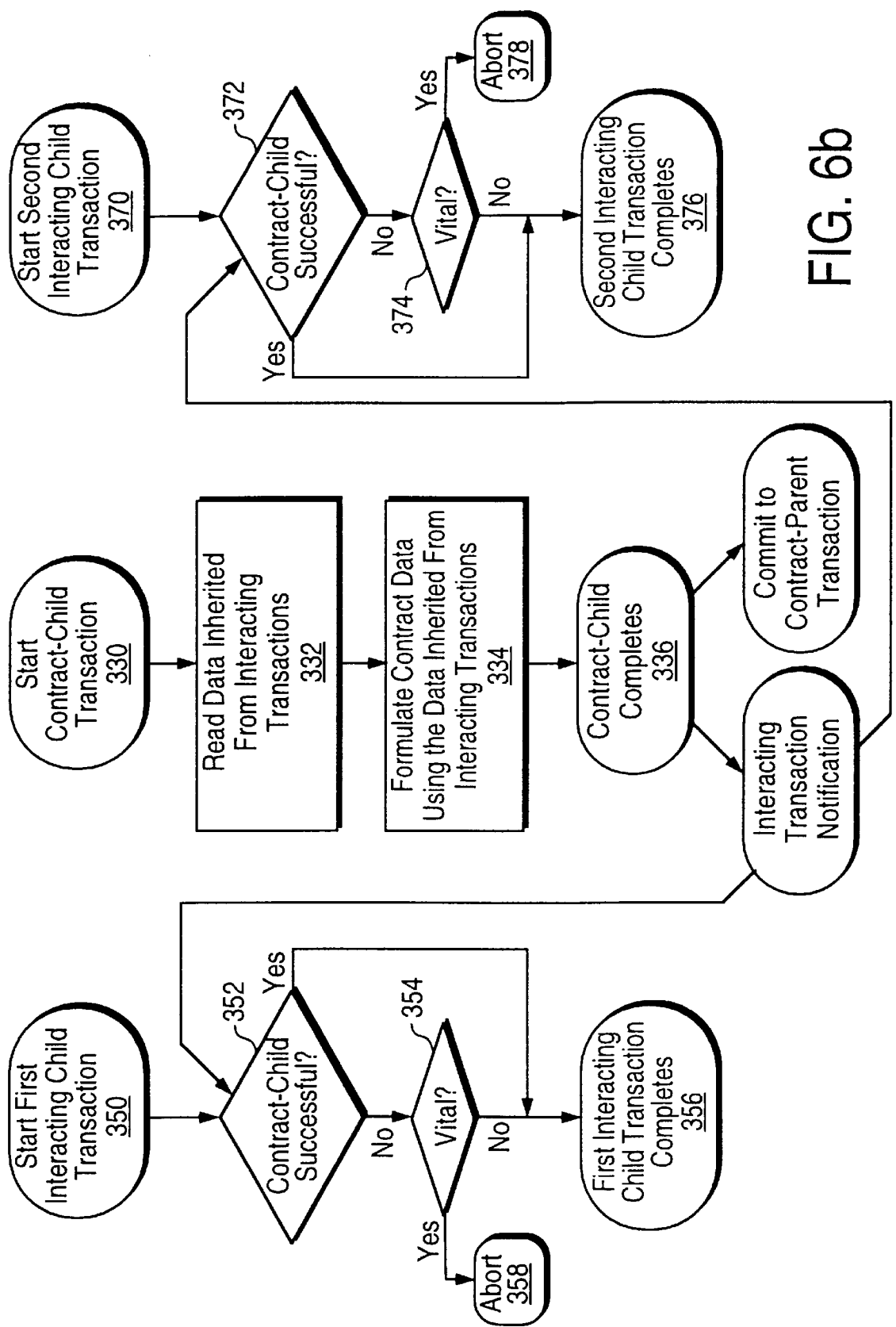

FIGS. 6a–6b illustrate the interaction among the information processes 66 and 68 and the contract process 22 for the embodiment shown in FIG. 5. The processes 66 and 68 are referenced as the first and second processes, respectively. The interacting transactions 74 and 83 are referenced as the first and second interacting transactions, respectively.

The contract-top transaction 230 starts up at block 260. At block 262, the contract-top transaction 230 launches the first and second processes 66 and 68 as child processes. At block 268, the contract-top transaction 230 launches the contract-child transaction 232 as a child transaction after the interacting transactions 74 and 83 have started up at block 266. The contract-top transaction 230 launches the contract-child transaction 232 by invoking the start-transaction function of the process execution unit 24 and the process execution unit 24 enforces the start dependency that the contract-child transaction 232 has on the interacting transactions 74 and 83.

The contract-top transaction 230 waits at block 270 for the contract-child transaction 232 to complete. The process execution unit 24 provides the contract-top transaction 230 with an indication of wether the contract-child transaction 232 completed successfully or aborted. If the contract-child transaction 232 completes successfully, then control proceeds to block 274 to continue the contract operation. If the contract-child transaction 232 aborted, then the contract-top transaction 230 aborts at block 107 if the contract-child transaction 232 is vital to the contract-top transaction 230 as indicated in the transaction definition file 26. If the contract-top transaction 230 aborts, no contract data is committed to the information store 20.

At block 274, the contract-top transaction 230 waits for completion of the first and second processes 66 and 68. If both the first and second processes 66 and 68 complete successfully, then control proceeds to block 276. At block 276, the contract-top transaction 230 commits the contract data obtained from the contract-child transaction 232 to the information store 20

If either one or both of the first and second processes 66 and 68 aborts, then the contract-top transaction 230 aborts and does not commit the contract data obtained from the contract-child transaction 232 to the information store 20. Thus, the first and second processes 66 and 68 are deemed to be vital to the contract operation.

The contract-child transaction 232 starts up at block 330. At block 332, the contract-child transaction 232 reads data objects inherited from the interacting transactions 74 and 83. At block 334, the contract-child transaction 232 formulates contract data using the data inherited from the interacting transactions 74 and 83. The contract-child transaction 232 completes at block 336 by invoking the complete-transaction function of the process execution unit 24. The complete-transaction function determines from the indications in the transaction definition file 26 that the contract-child transaction 232 commits to the contract-top transaction 230 and that a notification of completion is to be provided to the interacting transactions 74 and 83.

The first process 66 starts up at block 280. Eventually, at block 282, the first process 66 launches the first interacting transaction 74 using the start-transaction function provided in the process execution unit 24. The first process 66 waits at block 284 for completion of the first interacting transaction 74. If the first interacting transaction 74 completes successfully then the first process 66 continues to block 288.

If the first interacting transaction 74 aborted, then the first process 66 aborts if the first interacting transaction 74 is indicated as vital in the transaction definition file 26. If the first interacting transaction 74 aborted and is not vital then the first process 66 continues to block 288.

At block 288, after all of the other vital child transactions of the first process 66 have successfully completed, control proceeds to block 290. If any of the vital children of the first process 66 aborts, then the first process 66 aborts. At block 290, the first process 66 commits to the information store 90 independently of the contract-top transaction 230. The first process 66 completes by invoking the complete-transaction function of the process execution unit 24. The process execution unit 24 logs the first process 66 as successfully completed.

The second process 68 starts up at block 310 and thereafter at block 312 launches the second interacting transaction 83. If the second interacting transaction 83 completes successfully at block 314 then the second process 68 continues to block 318. If the second interacting transaction 83 aborted, then the second process 68 aborts if the second interacting transaction 83 is indicated as vital in the transaction definition file 26. If the second interacting transaction 83 aborts and is not vital, the second process 68 continues to block 318.

At block 318, after all of the other vital child transactions in the second process 68 have successfully completed, control proceeds to block 320. If any of the vital children of the second process 68 aborts then the second process 68 aborts. At block 320, the second process 68 commits to the information store 92 independently of the contract-top transaction 230.

At block 350, the first interacting transaction 74 starts up and inherits a set of data objects from its birth parent transaction 72. The data objects inherited from the parent transaction 72 are available and visible to the contract-child transaction 232. At block 352, the first interacting transaction waits for completion of the contract-child transaction 232. If the contract-child transaction 232 completes successfully, then control proceeds to block 356 wherein the first interacting transaction 74 completes and commits to its birth parent transaction 72 by invoking the complete-transaction function of the process execution unit 24. If the contract-child transaction 232 aborts, then the first interacting transaction 74 aborts at block 354 if the contract-child transaction 232 is registered in the transaction definition file 26 as being vital.

At block 370, the second interacting transaction 83 starts up and inherits a set of data objects from its birth parent transaction 81 which are available and visible to the contract-child transaction 232. At block 372, the second interacting transaction 83 waits for completion of the contract-child transaction 232. If the contract-child transaction 232 completes successfully, then control proceeds to block 376 wherein the second interacting transaction 83 completes and commits to its birth parent transaction 81 by invoking the complete-transaction function of the process execution unit 24. If the contract-child transaction 232 aborts, then the second interacting transaction 83 aborts at block 374 if the contract-child transaction 232 is registered as being vital.

A variety of mechanisms may be employed by the process execution unit 24 to enable access to data sets and to allow transactions to inherit data sets and commit data updates for their inherited data sets. In one embodiment, the data set of a parent transaction may be contained in a data table of a database system. The child transactions of the parent transaction are allowed access to the data tables when they inherit data sets from the parent. The child transactions may use SQL statements to commit data updates for the inherited data sets.

In another embodiment, the data set for a parent may also be contained in a file. The child transactions of the parent transaction are allowed access to the file when they inherit the data set. The process execution unit 24 controls access to the file and passes "keys" to the file during the start-transaction and complete-transaction functions. Data updates from a child transaction may be written to an update log file for a data set file when the child transaction commits to the parent transaction.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information system, comprising:

first process including a parent transaction and a set of child transactions one of which is an interacting transaction of the first process wherein the parent transaction of the first process holds a set of data updates generated by each of the child transactions of the first process until all of the child transactions of the first process have completed;

second process including a parent transaction and a set of child transactions one of which is an interacting transaction of the second process wherein the parent updates generated by each of the child transactions of the second process until all of the child transactions of the second process have completed;

contract process that obtains a set of data updates from the interacting transaction of each of the first and second processes prior to completion of the first and second processes and that generates a set of contract data based upon the data updates from the first and second processes wherein the contract data represents an agreement between enterprises associated with the first and second processes.

2. The information system of claim 1, wherein the contract process holds the contract data until completion of the first and second processes.

3. The information system of claim 2, wherein the contract process discards the contract data if one or both of the first or second processes fails.

4. The information system of claim 1, wherein the contract process comprises:

contract-top transaction that is a parent of each of the first and second processes and that holds the contract data until completion of the first and second processes;

contract transaction that obtains the data updates from the interacting transactions of the first and second processes and then commits the data updates to the contract-top transaction.

5. The information system of claim 4, wherein the contract transaction is a parent of the interacting transactions of the first and second processes.

6. The information system of claim 5, wherein the interacting transactions of the first and second processes each inherit a data set from the contract transaction.

7. The information system of claim 5, wherein the interacting transactions of the first and second processes each inherit a data set from their respective parent transactions in the first and second processes.

8. The information system of claim 5, wherein the interacting transactions of the first and second processes each commit their respective updates to the contract transaction.

9. The information system of claim 5, wherein the interacting transactions of the first and second processes are vital to the contract transaction such that the contract transaction fails if one or more of the interacting transactions fails.

10. The information system of claim 5, wherein the interacting transactions of the first and second processes are not vital to the contract transaction such that a failure of one or more of the interacting transactions does not cause the contract transaction to fail.

11. The information system of claim 5, wherein the interacting transactions are vital to their respective parent transactions in the first and second processes such that if one of the interacting transactions fails then the respective parent transactions fails.

12. The information system of claim 5, wherein the interacting transactions are not vital to their respective parent transactions in the first and second processes such that a failure of one of the interacting transactions does not cause the respective parent transactions to fail.

13. The information system of claim 4, wherein the contract transaction is a child of each interacting transaction in the first and second processes.

14. The information system of claim 13, wherein the contract transaction inherits a data set from each of the interacting transactions of the first and second processes.

15. The information system of claim 13, wherein the contract transaction is vital to one or more of the interacting transactions of the first and second processes such that a failure of the contract transaction causes one or more of the interacting transactions to fail.

16. The information system of claim 13, wherein the contract transaction is not vital to one or more of the interacting transactions of the first and second processes such that a failure of the contract transaction does not cause one or more of the interacting transactions to fail.

* * * * *